R. WRIGHT.
DEMOUNTABLE RIM.
APPLICATION FILED NOV. 13, 1915.
1,200,566.
Patented Oct. 10, 1916
2 SHEETS—SHEET 1.
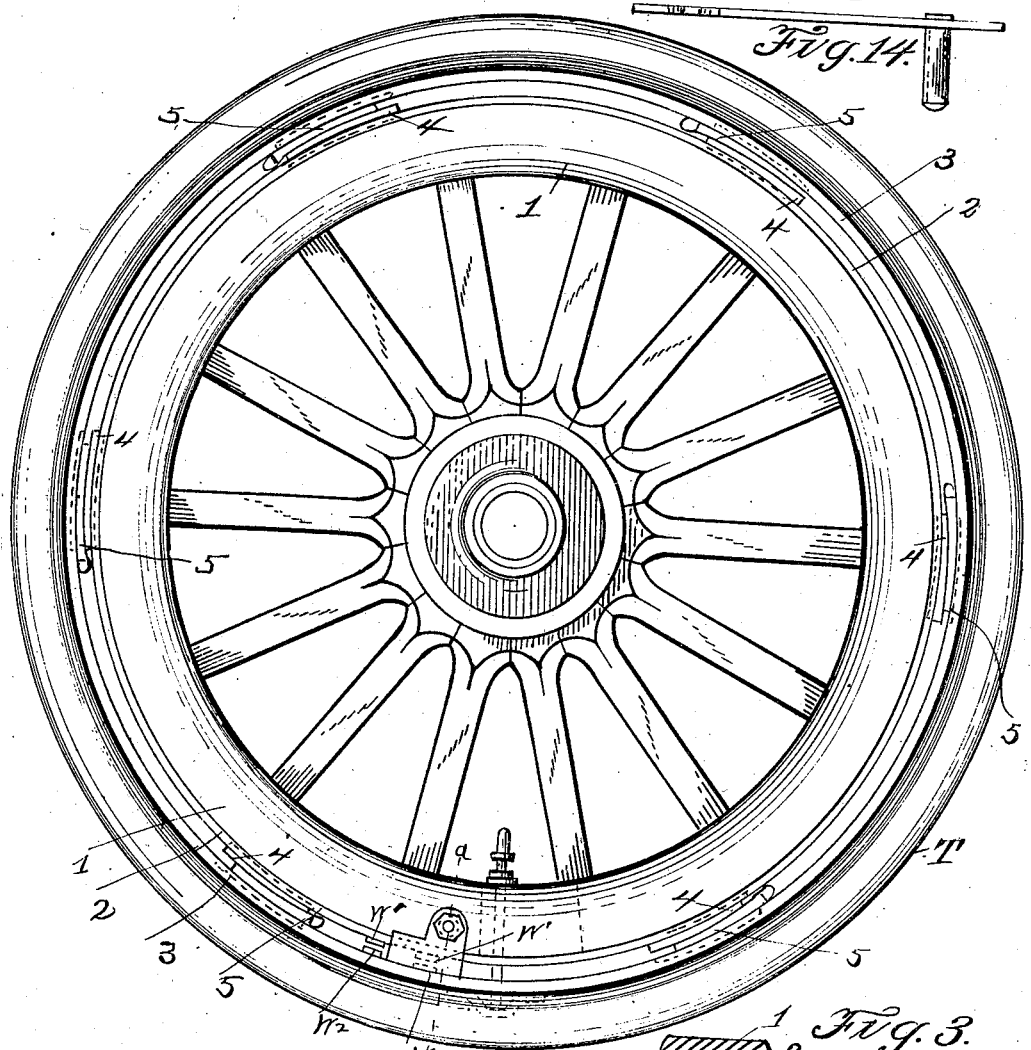
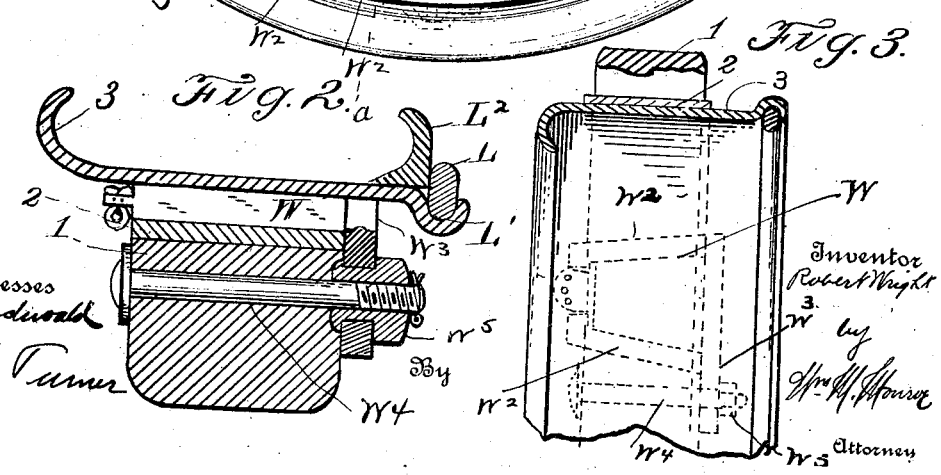
Inventor
Robert Wright
by
Attorney
Witnesses

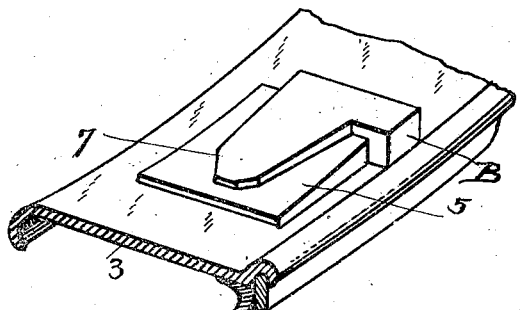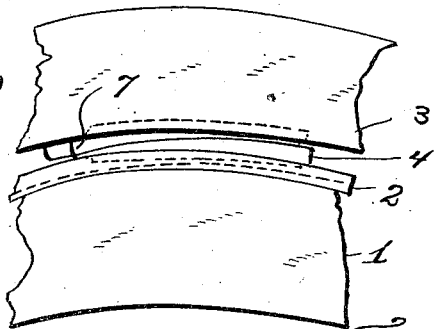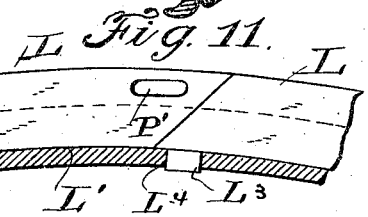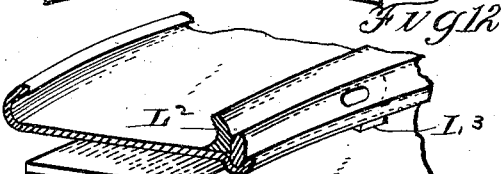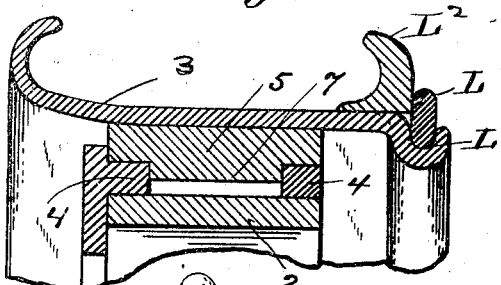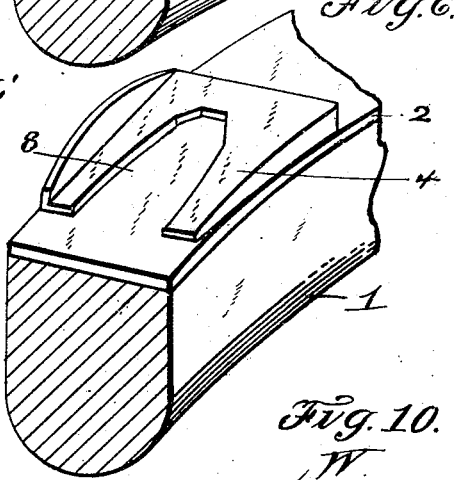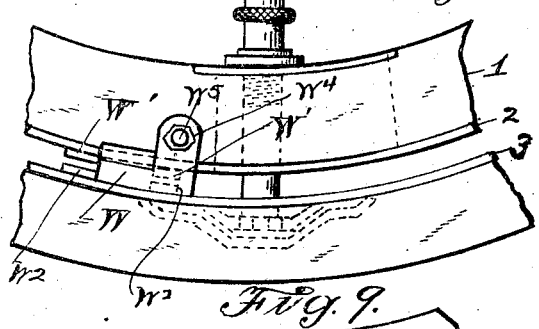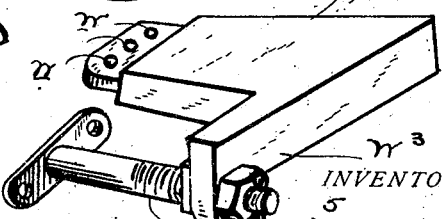

UNITED STATES PATENT OFFICE.

ROBERT WRIGHT, OF CLEVELAND, OHIO, ASSIGNOR OF ONE-HALF TO FRANK J. BOMMER, JR., OF CLEVELAND, OHIO.

DEMOUNTABLE RIM.

1,200,566. Specification of Letters Patent. Patented Oct. 10, 1916.

Application filed November 13, 1915. Serial No. 61,291.

*To all whom it may concern:*

Be it known that I, ROBERT WRIGHT, a citizen of the United States, and resident of Cleveland, in the county of Cuyahoga and State of Ohio, have invented certain new and useful Improvements in Demountable Rims, of which I hereby declare the following to be a full, clear, and exact description, such as will enable others skilled in the art to which it appertains to make and use the same.

The objects of the invention are to provide simple and efficient means for rigidly attaching a demountable tire carrying rim to the metal felly band or base rim of a vehicle wheel, and the invention includes the following described instrumentalities for accomplishing this result in the quickest and most secure manner.

It includes a series of circumferentially arranged complementary wedging surfaces spaced apart upon the adjoining peripheries of the rim and felly band.

It further includes interlocking means preventing lateral separation of the demountable rim and felly band, when in their assembled positions.

It further includes wedging means acting transversely of the rim and band to draw the circumferential wedges together and to lock the assembled rim and band from movement in any direction.

The invention further includes the forms of construction and combination and arrangement of parts hereinafter described, shown in the accompanying drawings and specifically pointed out in the claims.

In the accompanying drawings Figure 1 is a side elevation of an automobile wheel containing the hereinafter described improvements; Fig. 2 is a transverse section on line *a—a* Fig. 1, showing the locking wedge inserted between the demountable rim and the metal felly band; Fig. 3 is a plan view of the rim and felly band showing the locking wedge which prevents circumferential movement of the assembled parts in dotted lines; Fig. 4 is a side elevation of the rim and felly showing complementary circumferential wedges thereon; Fig. 5 is a perspective view of one of the wedges upon the inner periphery of the rim; Fig. 6 is a similar view of one of the complementary wedges upon the outer periphery of the felly band; Fig. 7 is a transverse section taken through the rim and felly band, and through said complementary wedges thereon; Fig. 8 is a side elevation of the rim and felly band showing the construction of the interlocking wedge and abutment therefor upon said rim and felly band; Fig. 9 is a perspective view of the protecting plate employed to cover the elongated opening in the felly for the valve stem; Fig. 10 is a perspective view of the interlocking wedge; Fig. 11 is a section showing the tire holding ring; Fig. 12 is a perspective thereof; Figs. 13 and 14 are details of wrench employed.

In these views 1 is the wooden felly of the wheel, 2 is the metal felly band or base rim, 3 is the outer or demountable rim upon which the tire T is mounted.

In order to facilitate the assembling and interlocking of the rim with the felly band, a spaced series of wedge members 4, 4, are secured by fusing, riveting or other suitable means upon the outer periphery of the felly band, and extend in the same circumferential direction thereon. 5, 5, are complementary wedge members upon the inner periphery of the rim. These complementary wedge members are engaged with each other after sleeving the rim over the felly band, by revolving the rim circumferentially about the band until the parts are in rigid connection with each other. One series of wedge members is provided with raised or radially projecting tongues 7, 7, and the other series with complementary wedge shaped openings or longitudinal slots 8, 8, into which the tongues are introduced when the parts are assembled together, and the wedging surfaces are brought into engagement with each other. This construction positively prevents lateral movement of the rim upon the band and the wedging surfaces serve to accurately space apart and center the wheel within the rim and to prevent lateral or radial movement of any part of the rim upon the band.

To further aline and prevent too great inward movement of the rim upon the band, the wedge members upon the band are provided with marginal flanges F, F, against which the wedge members upon the rim strike and are prevented from further movement.

Means are also employed for providing driving shoulder for the engaging parts of band and rim. These shoulders also serve the function of forming engaging faces which comprise the sides of right angled triangles, of which the flanges F, F, comprise the other side.

It will be seen by reference to Figs. 5 and 6 that when one of the wedges 5 is superimposed upon one of the wedges 4, the flange F on wedge 4 engages the rear side of the wedge 5, and the shoulder B extending laterally from the outer side of the wedge 5 and upon the thicker end engages the thinner edge of the wedge 4, thus inclosing the wedges on two sides and locking them in place to prevent slipping or twisting of the parts in any direction.

The double wedges (the ones on the rim being the converse of those on the band) serve as spacing means between the rim and band and the shoulder B serves also as a driving means since it should be so placed as to engage the wedge 4 while driving the machine. The shoulder B is also projected laterally in the form of a boss, which can be struck with a hammer to loosen the engagement of the wedges when demounting the rim and when assembling the parts.

To assist in drawing the rim circumferentially upon the felly band and for detachably locking it rigidly at one point in such a manner that it cannot become accidentally loosened or relased, a transversely placed wedge W is inserted between the rim and felly band which acts upon oppositely placed ribs or bars W′ W², upon both the rim and band to draw the parts tightly into place and lock them there against circumferential movement in either direction. This wedge is provided with an arm W³ turned aside to permit the introduction of a bolt W⁴ therethrough and through the wheel felly. This bolt passes through a nut W⁵ swiveled in the arm, by means of which the wedge can be forced securely into place.

A fastening means for preventing the escape of the wedge and release of the rim from the wheel while the machine is on the road is shown in Figs. 2, 3, and 10. Here the inner extremity of the wedge is extended beyond the band, and openings w, w, are shown through which cotter pins w′, w′ are inserted. This precautional measure is important since too much dependence should not be placed upon a fastening bolt, especially at high speed or upon long trips.

At B, B, are shown heavy lugs or bosses extending outwardly upon the rim series of wedges upon which blows can be struck to facilitate sliding the outer and inner series of wedges over each other when assembling the parts, and for separating them when demounting the rim.

When assembling the parts the rim is revolved over the felly band circumferentially until the outer and inner series of wedges are in engagement and until the transverse wedge can be entered into its seat between the ridges R, R, after which the wrench is applied to the nut and the wedge driven into its place.

At L is shown a split ring which is partially embedded in a marginal groove L′ in the rim and which retains the tire holding ring L² in place.

A lug L³ entering a groove L⁴ in the rim secures one end of the split ring. When releasing the split ring the point of the wrench is inserted in an opening P′ in the other end of the split ring.

Having described the invention what I claim as new and desire to secure by Letters Patent is:

1. In combination, a felly band and a demountable tire carrying rim thereon, a series of circumferentially spaced wedges on the band, and a series of conversely arranged wedges on the inner face of said rim, a radially extending flange on the inner edge of each wedge on said band, engaged by the inner edge of the corresponding wedge on said rim, and a transverse shoulder upon the thickest end of each wedge on said demountable rim extending laterally therefrom, said shoulder engaging the thinnest edge of the corresponding wedge upon said band.

2. In combination, a felly band and a demountable tire carrying rim thereon, a series of circumferentially spaced wedges on the band, and a series of conversely arranged wedges on the inner face of said rim, a radially extending flange on the inner edge of each wedge on said band, engaged by the inner edge of the corresponding wedge on said rim, and a transverse shoulder upon the thickest end of each wedge on said demountable rim extending laterally therefrom, said shoulder engaging the thinnest edge of the corresponding wedge upon said band, said flange and shoulder forming the sides of a right-angled triangle and providing a locking means for each pair of said wedges adapted to resist circumferential and lateral movement of said wedges upon each other, said shoulder serving also as a driving means.

3. In combination, a felly band and a demountable tire carrying rim thereon, a series of circumferentially spaced wedges on the band, and a series of conversely arranged wedges on the inner face of said rim, a radially extending flange on the inner edge of each wedge on said band, engaged by the inner edge of the corresponding wedge on said rim, and a transverse shoulder upon the thickest end of each wedge on said demountable rim extending laterally therefrom, said shoulders engaging the thinnest edge of the corresponding wedge upon said band, said shoulder terminating in a laterally extending boss substantially as and for the purpose set forth.

4. In combination, a felly band, and a demountable tire carrying rim therefor, a series of circumferentially directed wedges spaced about the outer face of said band, a corresponding series of conversely shaped wedges upon the inner face of said rim, a separate abutment flange upon the inner edge of each wedge on said band, and a separate combined driving and locking shoulder on each of the wedges on said rim, said shoulder engaging the thin edge of the engaging wedge.

5. In combination, a felly band, and a demountable tire carrying rim thereon, said rim and band having spacing wedges upon their approximated surfaces, transverse spaced projections located upon corresponding positions upon the adjoining faces of rim and band, a wedge adapted to enter between said spaced projections, an adjusting bolt for said wedge and additional protective means preventing the withdrawal of said wedge and acting independently of said bolt.

In testimony whereof, I hereunto set my hand this 11 day of Nov., 1915.

ROBERT WRIGHT.

In presence of—
WM. M. MONROE.
J. C. TURNER.